United States Patent [19]
Wurtzinger

[11] Patent Number: 4,490,742
[45] Date of Patent: Dec. 25, 1984

[54] ENCODING APPARATUS FOR A CLOSED CIRCUIT TELEVISION SYSTEM

[75] Inventor: Richard E. Wurtzinger, Oak Park, Ill.

[73] Assignee: VCS, Incorporated, Carol Stream, Ill.

[21] Appl. No.: 371,198

[22] Filed: Apr. 23, 1982

[51] Int. Cl.³ ............................................... H04N 5/26
[52] U.S. Cl. .................................. 358/183; 358/108; 358/125; 358/185
[58] Field of Search ............... 358/183, 185, 108, 107, 358/105, 103, 125, 100, 106

[56] References Cited

U.S. PATENT DOCUMENTS

| | | | |
|---|---|---|---|
| 3,786,481 | 1/1974 | Hartman | 358/183 |
| 3,916,094 | 10/1975 | Marrone | 358/183 |
| 3,984,268 | 10/1976 | Sharp | 358/183 |
| 4,045,815 | 8/1977 | Griffin | 358/183 |
| 4,064,528 | 12/1977 | Bowerman | 358/183 |
| 4,064,540 | 12/1977 | Jetten | 358/183 |
| 4,084,184 | 4/1978 | Crain | 358/108 |
| 4,208,675 | 6/1980 | Bajon | 358/183 |
| 4,288,809 | 9/1981 | Yabe | 358/183 |
| 4,402,009 | 8/1983 | Rathjens et al. | 358/125 |

Primary Examiner—Tommy P. Chin
Attorney, Agent, or Firm—McDougall, Hersh & Scott

[57] ABSTRACT

Apparatus for generating an indicator on a remote monitor screen representative of the orientation of the monitoring camera. A sensor on the camera produces a signal proportional to the camera orientation. An encoder, including a sawtooth generator, a comparator, and time delay single-shot multivibrators, is synchronized to the camera video horizontal and vertical synchronization signals to provide a camera orientation indicator on the monitor. A modulator at the camera superimposes the encoded indicator signal onto the camera video signal thereby producing a single composite signal for transmission preferably over a single video or RF cable to the monitor.

9 Claims, 4 Drawing Figures

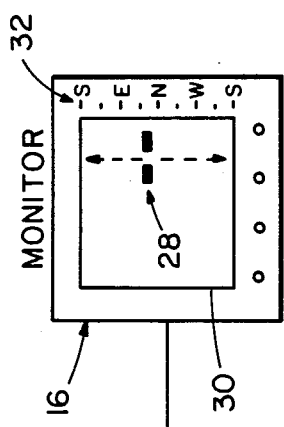
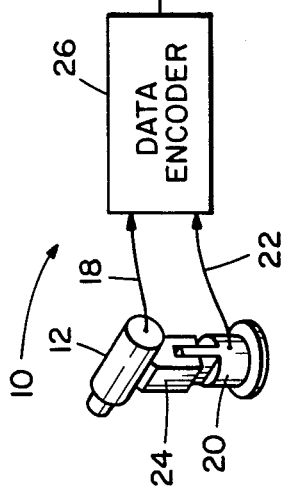
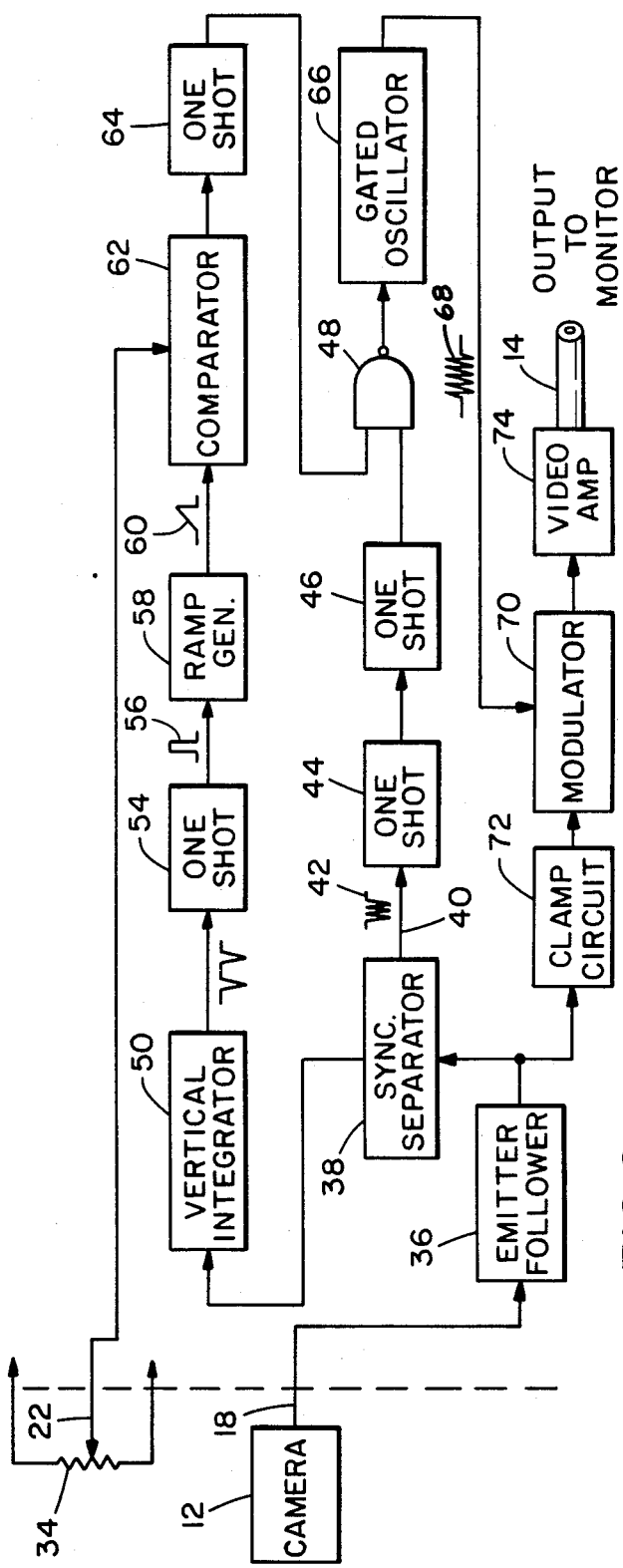
FIG.1
FIG.2

ENCODING APPARATUS FOR A CLOSED CIRCUIT TELEVISION SYSTEM

BACKGROUND OF THE INVENTION

This invention generally relates to an apparatus for encoding a first signal upon the video signal from a camera in a closed circuit television (CCTV) system so that the first signal is displayed on a video monitor as an indicator concurrently with the video from the camera. The position of the indicator on the screen of the monitor changes in response to changes in the first signal. This invention is particularly, but not exclusively, suited to provide an indicator on the screen of the video monitor in which the position of the indicator corresponds to the azimuth or compass direction of the camera.

In conventional CCTV systems, an analog signal corresponsing to the direction or azimuth in which the camera is pointing is transmitted by a transmission line separate from that transmitting the video information. For example, a DC meter calibrated in compass point directions may be used at the site of the monitor to indicate the azimuth of the camera.

Although such conventional azimuthal display systems have been generally successful, certain disadvantages have yet to be solved. Providing a separate transmission line from the video transmission line increases both the material and labor cost of the CCTV system. In typical systems in which several adjacent monitors are located for concurrent viewing, confusion may exist as to which azimuthal indicator (meter) corresponds to which monitor. Also, each DC meter used as an indicator must be individually calibrated since the resistance of each azimuthal transmission line will vary.

An object of the present invention is to provide an apparatus for encoding a data signal such as representing the azimuth of a camera in a CCTV system onto the video signal from the camera thereby eliminating the need for a separate transmission line for such data.

A further object of the present invention in providing such an encoding apparatus is to encode the data on the video signal such that a monitor concurrently displays the video image and an indicator whose position on the monitor corresponds to the data.

SUMMARY OF THE INVENTION

One purpose of this invention is to provide an apparatus for encoding a signal onto the video output of a camera in a CCTV system to form a composite signal which may be carried by a single transmission line to a remote monitor. The signal is encoded onto the video signal such that the monitor displays the composite signal as a video picture having an indicator whose position on the monitor screen corresponds to the signal. Where the signal corresponds to the azimuth of the camera, the position of the indicator on the screen of the monitor will correspond with the direction (azimuth) in which the camera is pointing.

The encoding means according to this invention is particularly adapted for use in a CCTV system including a camera having an output containing a video signal, vertical synchronization (sync) signal, and horizontal sync signal, a means for generating a first signal which corresponds to the azimuth of the camera, a monitor for displaying the video signal, and a single line for transmitting the video signal from the camera to the monitor. The encoding means modulates the video signal so as to display an indicator within a predetermined area of the screen of the monitor. The position of the indicator varies in response to the first signal to reflect corresponding changes in the azimuth of the camera.

In the preferred embodiment of the present invention the encoding means may include a means for separating the vertical and horizontal sync signals from the output signal of the camera. A ramp generator provides periodic output ramps having a predetermined rate of voltage change and is time synchronized with the vertical sync signal. The ramp generator output and the first signal are compared by a comparator whose output is utilized to trigger a monostable (one shot). The time the monostable is triggered relative to the vertical sync signal determines the vertical location of the indicator and the time period of the monostable controls the vertical width of the indicator.

The horizontal sync signal is used to trigger a first monostable whose output triggers a second monostable. The time duration of the first monostable determines the horizontal starting point of the indicator on the screen and the time period of second triggered monostable determines the horizontal termination point of the indicator on the screen. The output of the second monostable is "anded" with the output of the one shot driven by the comparator to provide a control signal to a gated oscillator. A modulation means in circuit with the video signal from the camera is driven by the gated oscillator for modulating the video signal to define the indicator on the monitor. The gated oscillator modulates the video signal to define alternating white and black line segments. The number of periodically alternating line segments is defined by the frequency of the gated oscillator. The position of the indicator, which in the illustrative embodiment is adjacent the right vertical edge of the monitor, is controlled in response to the first signal.

BRIEF DESCRIPTION OF THE DRAWINGS

FIG. 1 is a pictorial representation of a CCTV system which includes an encoding apparatus according to the present invention.

FIG. 2 is a block diagram illustrating an embodiment of the present invention.

DETAILED DESCRIPTION

Figure 3A:
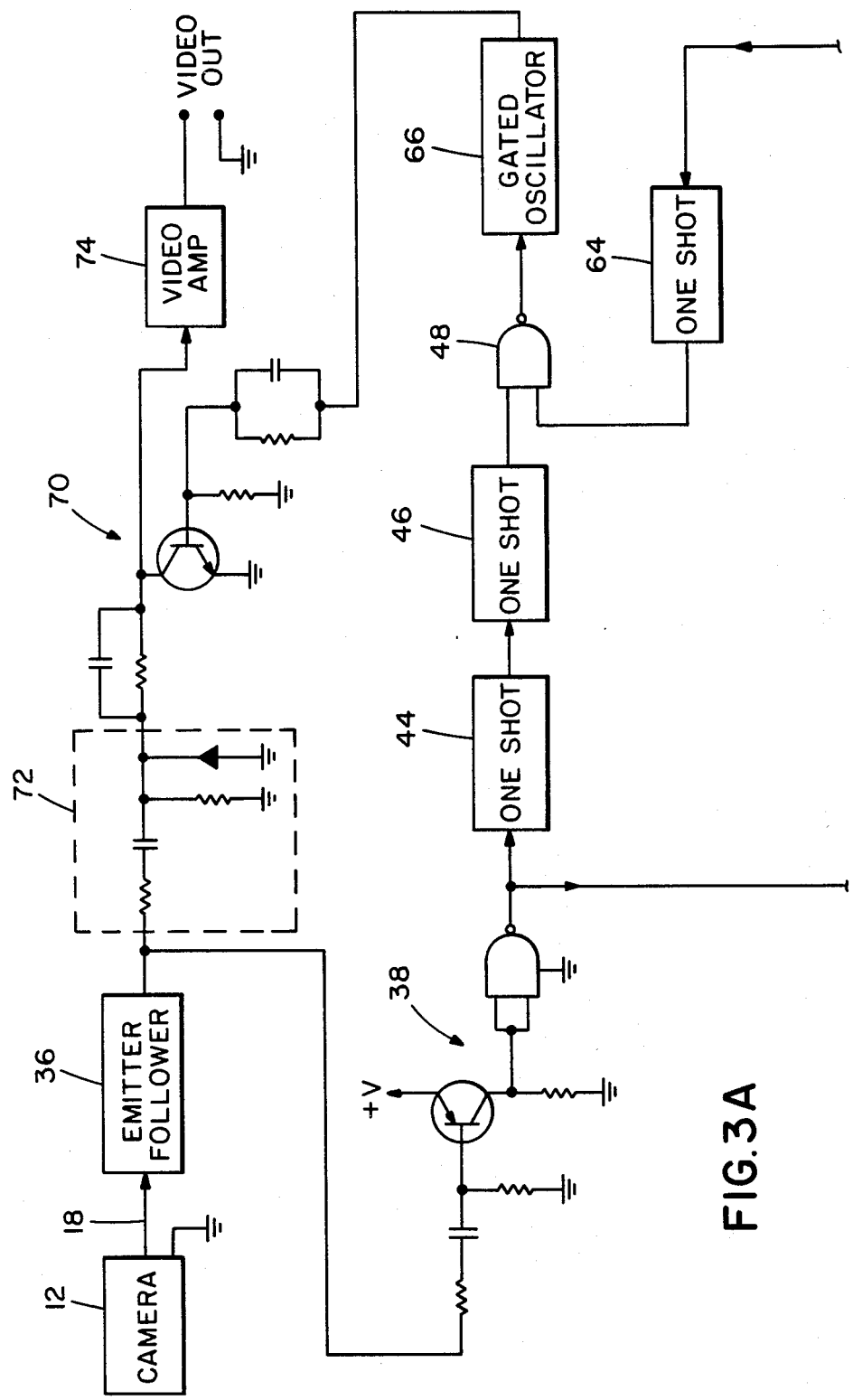
FIGS. 3A and 3B together represent a schematic diagram of the embodiment of the present invention with certain sections illustrated in block diagram form.

FIG. 1 illustrates a CCTV system 10 including a camera 12, a transmission line 14 and a monitor 16. The output 18 of the camera includes a video signal, a horizontal sync signal, and a vertical sync signal. A conventional remotely controlled panning mount 20 controls the horizontal orientation of the camera, that is, the azimuth of the camera. The mount 20 includes an output 22 that typically provides an analog signal, such as presented by the changing resistance of a potentiometer, which corresponds to the azimuth of the camera. Another conventional remotely controlled mount 24 may be utilized to control the elevational angle of the camera.

A data encoder 26 according to the present invention receives the output 18 of the camera and the output 22 of the panning mount, and has its output connected to transmission line 14. The encoder modulates the video signal from the camera in response to the azimuth signal to form a composite signal which defines an indicator 28 as displayed upon the screen 30 of the monitor. The dashed vertical arrow adjacent the indicator 28 in FIG. 1 illustrates that the indicator can move vertically within a predetermined area adjacent the right vertical edge of the monitor. A compass direction legend 32 is preferably disposed adjacent the area in which the indicator may travel. In FIG. 1, the position of the indicator shows that the camera is pointing slightly east of north. The illustrative indicator 28 consists of a line segment or segments.

FIG. 2 illustrates a block diagram of an embodiment of an analog encoder 26 to the right of the dashed vertical line in which the output 18 of camera 20 and the output 22 of potentiometer 34 provide inputs to the encoder. The potentiometer is mounted to pan mount 20 so that its wiper moves as the camera 12 rotates. A fixed potential may be applied across the potentiometer so that the wiper voltage will consist of an analog voltage having a magnitude which varies dependent upon the azimuth of the camera.

Emitter follower 36 buffers output 18 and couples it to synchronization separator 38 and to clamp circuit 72 which will be described below. Separator 38 functions to separate the vertical and horizontal signals from the output 18 of the camera. The output 40 of the separator contains the horizontal sync signals depicted as waveform 42 which periodically triggers one shot 44. The output of one shot 44 in turn triggers one shot 46 whose output is connected to an input of a NAND gate 48. The predetermined time period of one shot 44 controls the horizontal location on the screen at which indicator 28 will begin and the time period of one shot 46 defines the horizontal termination point of the indicator. Since the outputs of one shots 44 and 46 are in time synchronization with the horizontal sync signals, a predetermnined area adjacent the right vertical edge of monitor 16 is defined in which the indicator may appear. The vertical location of the indicator within this area is controlled by separate circuitry as described below.

The output of separator 38 is also supplied to vertical integrator 50 which further processes the output of the separator to provide pulses 52 corresponding to the vertical sync signals of the picture to be displayed on the monitor. The output pulses from integrator 50 are used to trigger one shot 54 which provides output pulses 56 which in turn controls ramp generator 58. The ramp generator produces periodic sawtooth waveforms 60 of increasing voltage during the time period of pulses 56.

The output of the ramp generator provides one input to comparator 62 and the other input to the comparator is provided by the analog voltage signal 22 from potentiometer 34. Signal 22 consists of a DC voltage whose magnitude corresponds to the azimuth of the camera. When the ramp output voltage equals the voltage of output 22 or a predetermined ratio thereof, the comparator changes states triggering one shot 64. The point in time of the triggering of one shot 64, which is relative to the beginning of the vertical screen sweep, determines the upper horizontal edge of indicator 28. The preselected time period of one shot 64 defines the vertical width of line segment indicator 28 since it limits the number of horiontal lines used to "write" the indicator.

NAND gate 48 acts as an enabling gate which defines those time intervals during the writing of the video image upon the screen in which gated oscillator 66 will be allowed to run. Since one input to gate 48 is in time synchronization with the horizontal scanning and the other input is time referenced to the vertical scanning, its output defines the specific screen location for the indicator on the monitor. A burst of an output waveform 68 is produced during the ON time interval of the oscillator. The frequency of oscillator 66 determines the number and length of alternating spaced apart line segments defining indicator 28 as well be explained below.

Signal 18 after being buffered by emitter follower 36 is also applied as an input to clamp circuit 72 which functions as a DC clamping circuit for clamping the AC video signal relative to a predetermined DC voltage level. Modulator 70 may comprise a switch that clamps the video signal to one level during one-half cycle of waveform 68 and to another level during the other half cycle. This produces alternating spaced-apart black and white line segments so that the indicator will be visible regardless of the color of the surrounding picture image. A conventional video amplifier 74 amplifies the modulated signal before it is connected to transmission line 14.

Figure 3B:
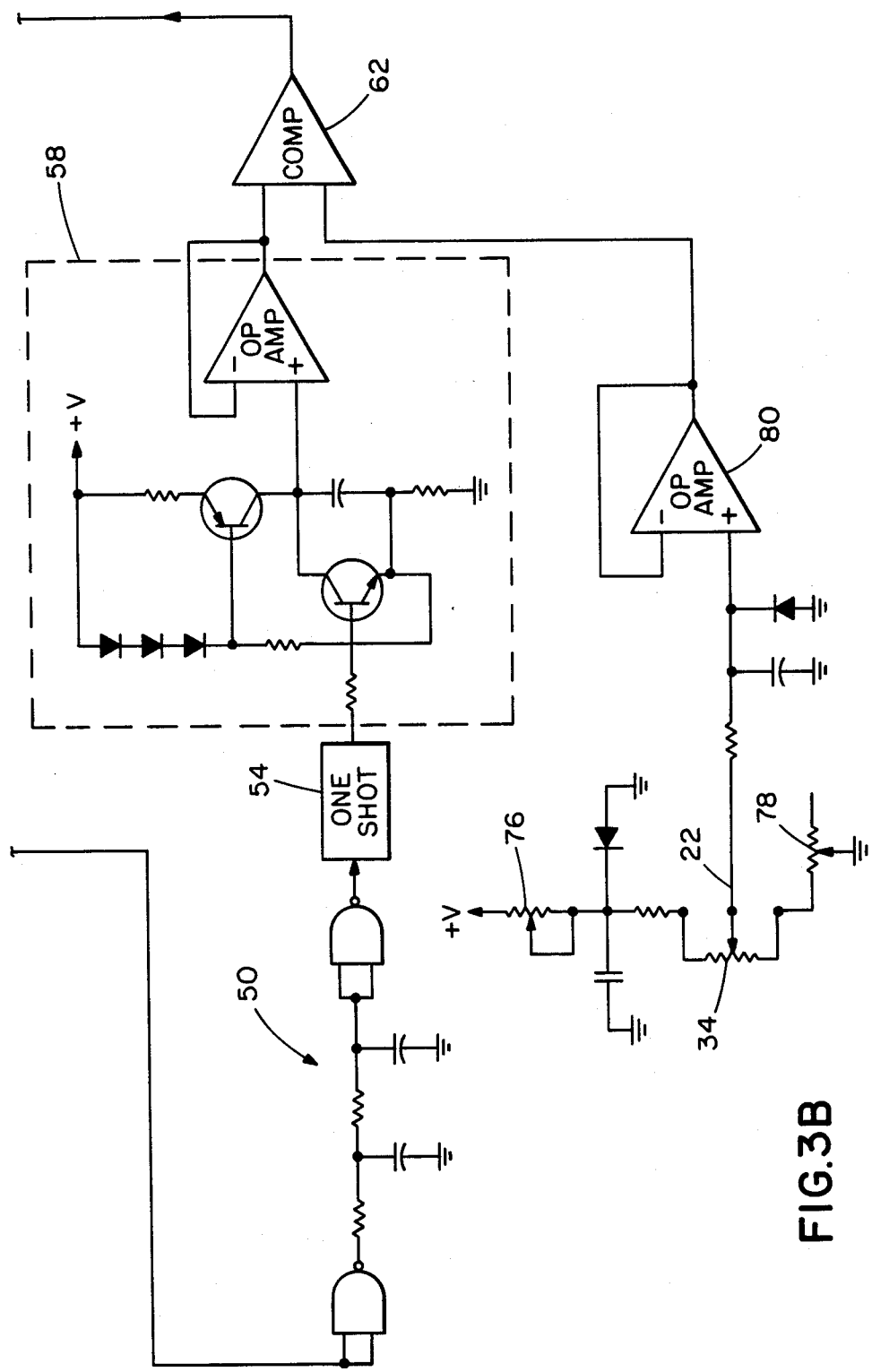

FIGS. 3A and 3B illustrate in greater detail the embodiment of the present invention as generally illustrated in FIG. 2. When the top of FIG. 3B is placed adjacent the bottom of FIG. 3A, it will be apparent that these two figures together define a diagram of the embodiment of the present invention. As seen in FIG. 3A, clamp circuit 72 consists of a conventional diode and capacitor clamping arrangement. The modulator 70 consists of a transistor switch driven between on and off states by the output of oscillator 66. Synchronization separator 38 consists of a transistor amplifier coupled to a NAND gate which acts as an inverting buffer.

In FIG. 3B, vertical integrator 50 consists of two RC integrator circuits connected between gates which function as inverting buffers. Ramp generator 58 consists of a PNP transistor which functions as a constant current source to charge a capacitor thereby generating a linearly increasing DC voltage which is coupled to an operational amplifier that serves as a unity gain buffer. An NPN transistor connected in parallel with the capacitor serves to maintain the capacitor in a discharged state when driven ON by one shot 54.

Potentiometer 76 and 78 which are connected in series with potentiometer 34 provide an adjustment means for setting the range of voltages which will appear at the wiper of potentiometer 34 due to movement of the camera. Operational amplifier 80 serves as a unity gain buffer between output 22 and comparator 62.

One shots 44, 46, 54 and 64 may each be formed from one-half of a dual monostable multivibrator such as an MC 14538. Gated oscillator 66 may be formed from a conventional NE 555 timing circuit utilized in the gateable free running oscillator mode.

It will be apparent to those having skill in the pertinent art that modifications and substitutions can be made to the embodiment of the present invention described and shown herein without departing from the spirit of the invention. For example, the indicator can be made to move vertically along the left vertical edge of the screen of the monitor by changing the time periods of one shots 44, 46. If an alternating broken line segment was not desired as an indicator, the gated oscillator could be deleted and a single continuous line could be displayed as the indicator. Since the primary requirement of the indicator is a visual reference, other indicator shapes could be substituted.

The indicator could be made to move in a predetermined generally horizontal area adjacent either the top or bottom edge of the screen of the monitor by comparing the azimuth data signal with the horizontal rather than the vertical synchronized signal. It will also be apparent that two or more encoders could be placed in circuit with the video signal from a camera to cause corresponding indicators to be displayed in different areas on the monitor thereby permitting the simultaneous visual monitoring of a plurality of events or conditions represented by each indicator.

This invention provides several desireable features for a CCTV system. It enables the azimuth of the camera or other condition to be simultaneously transmitted with the video signal to the monitor via a single transmission line. The term single transmision line is used to mean transmission line having only two conductors such as a conventional coax cable or a single channel in a wireless transmission system. Thus, this invention eliminates the need for additional wires (conductors) or channels to carry the azimuthal signal. Because transmission line losses do not effect the calibration of the encoded signal, different transmission lines may be employed or substituted without the need of recalibrating. Where the signal represents the azimuth of the camera, the indicator corresponding to the azimuth is displayed directly upon the screen of the monitor which displays the video from the same camera thereby eliminating the possibility of confusion which might occur if a separate azimuth indicator were used.

While an embodiment of the present invention has been described above and illustrated in the drawings, the scope of this invention is defined by the claims appended hereto.

What is claimed is:

1. In a closed circuit television system having a camera of controllable azimuth which generates an output signal including a video signal, a horizontal synchronization signal, and a vertical synchronization signal, a monitor remote from said camera for displaying a picture defined by said video signal, and means proximate the camera for generating a first signal representative of the azimuth of the camera, the improvement comprising:

means for encoding said first signal whereby the encoded first signal defines an indicator for display on the monitor; means for transmitting the video signal and the encoded first signal to the monitor for simultaneous display thereon, said encoding means controlling the position of said indicator on the monitor in response to said first signal for providing a visual indication of the azimuth of said camera.

2. The apparatus according to claim 1 wherein said encoding means comprises:

first means for defining predetermined boundaries on said monitor for the display of said indicator, said first means defining said boundaries in response to one of said horizontal synchronization signal and vertical synchronization signal;

second means for defining the position of said indicator within said boundaries on said monitor, said second means defining said position in response to said first signal and in response to the other of the horizontal synchronization signal and vertical synchronization signal;

whereby the position of said indicator within said predetermined boundaries is responsive to said first signal and the position of the indicator changes to reflect changes in the azimuth of the camera.

3. The apparatus according to claim 2 wherein said first means includes at least one monostable having a selectable time period, said time period being determinative of said predetermined boundaries.

4. The apparatus according to claim 2 wherein said second means includes means for periodically generating a ramp signal in time synchronization with said other, and means for comparing said ramp signal to said first signal, said comparing means having an output responsive to a predetermined ratio of said first signal to said ramp signal, said output of said comparing means defining the position of said indicator within said boundaries.

5. The apparatus according to claim 2 wherein said encoding means further comprises means for separating said horizontal synchronization signal and said vertical synchronization signal from said output signal of the camera.

6. The apparatus according to claim 2 or 4 wherein said second means includes a monostable having a selectible time period, the duration of said time period controlling one dimension of the size of said indicator.

7. The apparatus according to claim 2 further comprising means for driving said modulating means so that the latter produces an indicator on said monitor having alternating black and white line segments, whereby said indicator can be readily seen regardless of the picture image displayed adjacent said indicator on the monitor.

8. The apparatus according to claim 7 wherein said driving means includes an oscillator having a preselected frequency which controls the number of indicator line segments generated.

9. The apparatus according to claim 1 wherein said transmitting means includes a single transmission line and wherein said encoding means includes means for combining the encoded first signal and the video signal before the video signal is coupled to said single transmission line, wherein said single transmission line concurrently transmits said first signal together with said video signal, thereby eliminating the need for a separate line to carry azimuth position information from said camera to said monitor.

* * * * *